April 10, 1934.    L. E. WHEELER    1,954,507
EGG BEATER
Filed Feb. 13, 1932
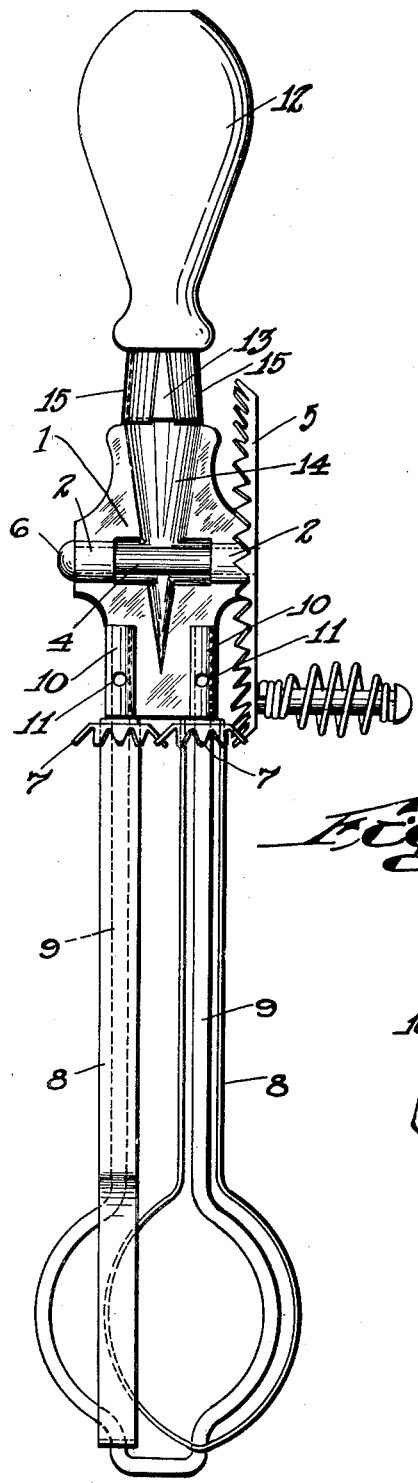
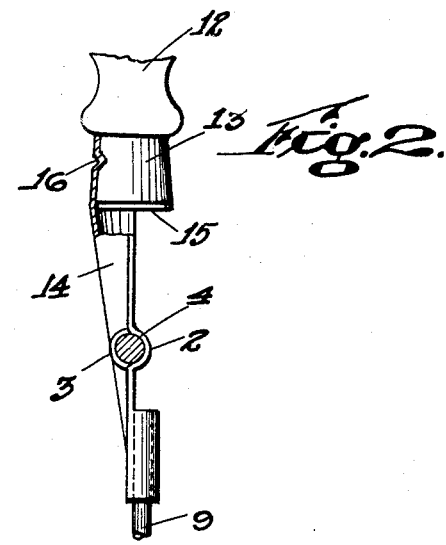
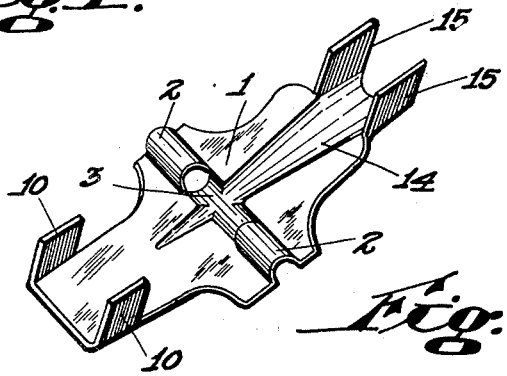
Inventor:
Levi E. Wheeler
by Owen W. Kennedy
Attorney Patented Apr. 10, 1934

1,954,507

UNITED STATES PATENT OFFICE 1,954,507

EGG BEATER

Levi E. Wheeler, Worcester, Mass., assignor to The Washburn Company, Worcester, Mass., a corporation of Massachusetts Application February 13, 1932, Serial No. 592,671

1 Claim. (Cl. 259—132)

The present invention relates to egg beaters, particularly of the hand operated type, in which a pair of beating elements are simultaneously rotated by turning a gear wheel with one hand while holding onto the handle of the beater with the other hand.

The object of the present invention is to provide a beater of the above described type, the essential members of which may be cheaply and readily made from pressed metal, and which when assembled together, will provide a strong and durable structure easy to operate. The above and other advantageous features of the invention will hereinafter more fully appear from the following description, reference being had to the accompanying drawing, in which:—

Fig. 1 is a view in side elevation of an egg beater embodying the invention.

Fig. 2 is a view, partially in section, of a portion of the parts shown in Fig. 1 turned through an angle of 90°.

Fig. 3 is a perspective view illustrating the appearance of the pressed metal body of the beater prior to the assembly of the parts thereon.

Like reference characters refer to like parts in the different figures.

Referring to the drawing, the beater comprises a body 1 preferably formed from a single piece of sheet metal, the body appearing as shown in Fig. 3 as it is stamped from the sheet metal stock. As formed, the body 1 is an integral structure upon which the other parts of the egg beater are subsequently assembled with a minimum expenditure of labor and material, as will hereinafter be described.

As best shown in Fig. 3, the central portion of the body 1 provides a pair of semi-cylindrical seats 2, 2, the metal between the seats 2, 2 being pressed in the opposite direction to provide a semi-cylindrical depression 3 of the same diameter as the seats 2. As shown in Fig. 1, the alined seats 2 and depression 3 are adapted to receive between them and rotatably support a shaft 4 carrying at one end a gear wheel 5, the other end of the shaft 4 providing a head 6 to prevent endwise movement of the shaft.

The teeth of the gear 5 are in mesh with the teeth of one of a pair of similar meshing pinions 7, 7 carried by beating elements 8, 8 of a form usually employed in egg beaters. The beating elements 8 are rotatably mounted upon the spaced legs 9, 9 of a wire beater frame, the upper ends of the legs 9 being rigidly secured to the body 1 by their reception in bent-over ears 10, 10 at the corners of the body 1. As best shown in Fig. 3, the ears 10 extend at right angles to the body 1, as originally formed, and are subsequently bent around the ends of the beater frame arms 9, each bent ear 10 being punched at 11 to hold the enclosed arm 9 in position.

The assembly of the egg beater is completed by the attachment of a handle 12 to the body, the handle 12 being preferably formed of wood with a reversely tapered attaching shank 13. In the formation of the body 1, the end of the body opposite to the ears 10 is provided with a semi-circular depression 14 extending at right angles to the depression 3 and of increasing width. The sides of the depression 14 are extended at right angles to the plane of the body 1 to provide ears 15, with the space between the ears 15 substantially equal to the greatest diameter of the handle shank 13. In attaching the handle 12 to the body 1, the reversely tapered shank 13 is positioned between the projecting ears 15 with its lower portion seated in the depression 14, after which the ears are bent around the shank 13, as shown in Fig. 1. As a result of the reverse taper of the shank 1, with its reduced diameter where it joins the handle proper, the bending of the ears 15 around the shank results in locking the body permanently to the handle. In other words, it is impossible for the body 1 to move on the handle longitudinally thereof, and turning of the body 1 on the handle 12 is effectively prevented by punching the metal of the depression 14 into the shank 13, as indicated at 16 in Fig. 2.

From the foregoing, it is apparent that by the present invention there is provided an improved egg beater construction characterized by a unitary sheet metal body so formed as to provide ready support for the other elements of the egg beater assembly. The offsetting of the depressions 3 and 14 from the plane of the body greatly strengthens the same against the transverse deflection, while the seats 2 and 10 provide ample bearing for the shaft 4 and the legs 9 of the beater frame. Furthermore, the bending of the ears 14 around the reversely tapered handle shank makes it practically impossible for the body to work loose from the handle, as a result of continued use of the beater.

I claim,

In an egg beater, a unitary sheet metal body, the central portion of which provides oppositely bent semi-cylindrical seat portions for receiving and supporting a shaft, the ends of said body providing integrally formed ears oppositely bent to receive and support a handle for holding the beater and the legs of a frame for the beating elements, with a depression extending longitudinally of the body and intersecting one of said seat portions serving to strengthen said body against flexure,

LEVI E. WHEELER.